United States Patent
Nevatia et al.

(10) Patent No.: US 8,705,793 B2
(45) Date of Patent: Apr. 22, 2014

(54) OBJECT TRACKING BY HIERARCHICAL ASSOCIATION OF DETECTION RESPONSES

(75) Inventors: Ramakant Nevatia, Pacific Palisades, CA (US); Chang Huang, Los Angeles, CA (US); Bo Wu, Mountain View, CA (US)

(73) Assignee: University of Southern California, Los Angeles, CA (US)

( * ) Notice: Subject to any disclaimer, the term of this patent is extended or adjusted under 35 U.S.C. 154(b) by 647 days.

(21) Appl. No.: 12/901,316

(22) Filed: Oct. 8, 2010

(65) Prior Publication Data

US 2011/0085702 A1     Apr. 14, 2011

Related U.S. Application Data

(60) Provisional application No. 61/249,905, filed on Oct. 8, 2009.

(51) Int. Cl.
*G06K 9/00* (2006.01)

(52) U.S. Cl.
USPC .......................................... 382/103; 382/226

(58) Field of Classification Search
CPC ........ G06T 7/20; G06T 7/2033; G06T 7/2073
USPC .................. 382/100, 103, 226, 227
See application file for complete search history.

(56) References Cited

U.S. PATENT DOCUMENTS

| | | | |
|---|---|---|---|
| 7,428,315 B2 * | 9/2008 | Rui et al. | 382/103 |
| 7,983,448 B1 * | 7/2011 | da Vitoria Lobo et al. | 382/103 |
| 2006/0203109 A1 * | 9/2006 | Ono | 348/239 |

OTHER PUBLICATIONS

AVSS 2007. Advanced Video and Signal Based Surveillance. 2007 IEEE International Conference on Advanced Video and Signal Based Surveillance, Sep. 5-7, 2007. Publicly available benchmark datasets for testing and evaluating detection and tracking algorithms for evaluation of an embodiment of a hierarchical association framework of the present disclosure. (Downloaded Jan. 13, 2011 from http://www.eecs.qmul.ac.uk/~andrea/avss2007_d.html).

CAVIAR: Context Aware Vision Using Image-Based Active Recognition. Description of project started Oct. 1, 2001 and ended Sep. 30, 2005. Publicly downloadable benchmark datasets for testing and evaluating detection and tracking algorithms for evaluation of an embodiment of a hierarchical association framework of the present disclosure. (Downloaded Jan. 13, 2011 from http://homepages.inf.ed.ac.uk/rbf/CAVIAR).

CLEAR 2007: Classification of Events, Activities and Relationships, Evaluation and Workshop, May 8-9, 2007, Baltimore, MD. Metrics in the CLEAR evaluation were adopted and automatic scoring software provided by the organizer was used to evaluate the present disclosure. (Downloaded Jan. 13, 2011 from http://www.clear-evaluation.org).

(Continued)

*Primary Examiner* — Shefali Goradia
(74) *Attorney, Agent, or Firm* — McDermott Will & Emery LLP

(57) ABSTRACT

Systems, methods, and computer readable storage media are described that can provide a multi-level hierarchical framework to progressively associate detection responses, in which different methods and models are adopted to improve tracking robustness. A modified transition matrix for the Hungarian algorithm can be used to solve the association problem that considers not only initialization, termination and transition of tracklets but also false alarm hypotheses. A Bayesian inference approach can be used to automatically estimate a scene structure model as the high-level knowledge for the long-range trajectory association.

20 Claims, 5 Drawing Sheets

(56) References Cited

OTHER PUBLICATIONS

Comaniciu, D. et al. 2001. The Variable Bandwidth Mean Shift and Data-Driven Scale Selection. In Proceedings of the 8th International Conference on Computer Vision, 2001, pp. 438-445.

Fortmann, T.E. et al. 1983. Sonar Tracking of Multiple Targets Using Joint Probabilistic Data Association. IEEE Journal of Oceanic Engineering, vol. OE-8, No. 3, Jul. 1983, pp. 173-184.

Huang, C. et al. 2008. Robust Object Tracking by Hierarchical Association of Detection Responses. Proceedings of the European Conference on Computer Vision 2008, Part II, LNCS 5303, pp. 788-801.

Kaucic, R. et al. 2005. A Unified Framework for Tracking Through Occlusions and Across Sensor Gaps. In IEEE Computer Society Conference on Computer Vision and Pattern Recognition, 2005. CVPR 2005, vol. 1, pp. 990-997.

Kuhn, H.W. 1955. The Hungarian Method for the Assignment Problem. Naval Research Logistics Quarterly, No. 2, pp. 83-97.

Leibe, B. et al. 2007. Coupled Detection and Trajectory Estimation for Multi-Object Tracking. In IEEE International Conference on Computer Vision, 2007, 8 pages.

Li, Y. et al. 2007. Tracking in Low Frame Rate Video: A Cascade Particle Filter With Discriminative Observers of Different Lifespans. In IEEE Conference on Computer Vision and Pattern Recognition, 2007, 8 pages.

Okuma, K. et al. 2004. A Boosted Particle Filter: Multitarget Detection and Tracking. In Proceedings of the European Conference on Computer Vision 2004, LNCS 3021, pp. 28-39.

Perera, A.G.A. et al. 2006. Multi-Object Tracking Through Simultaneous Long Occlusions and Split-Merge Conditions. In Proceedings of the 2006 IEEE Computer Society Conference on Computer Vision and Pattern Recognition (CVPR '06), pp. 666-673.

Reid, D.B. 1979. An Algorithm for Tracking Multiple Targets. In IEEE Transactions on Automatic Control, vol. AC-24, No. 6, Dec. 1979, pp. 843-854.

Singh, V.K. et al. 2008. Pedestrian Tracking by Associating Tracklets Using Detection Residuals. In IEEE Workshop on Motion and Video Computing, Jan. 8-9, 2008, Cooper Mt., CO, pp. 37-44.

Stauffer, C. 2003. Estimating Tracking Sources and Sinks. In Proceedings of the 2003 Conference on Computer Vision and Pattern Recognition Workshop (CVPRW '03), pp. 35-42.

Tomasi, C. et al. 1991. Detection and Tracking of Point Features, Technical Report CMU-CS-91-132. In Shape and Motion from Image Streams: A Factorization Method—Part 3. Carnegie Mellon University Technical Report. 22 pages.

Viola, P. et al. 2001. Rapid Object Detection Using a Boosted Cascade of Simple Features. In Proceedings of the 2001 IEEE Computer Society Conference on Computer Vision and Pattern Recognition, CVPR 2001, pp. I-511 to I-518.

Wu, B. et al. 2007. Detection and Tracking of Multiple, Partially Occluded Humans by Bayesian Combination of Edgelet Based Part Detectors. International Journal of Computer Vision, vol. 75, No. 2, pp. 247-266.

Yu, Q. et al. 2007. Multiple Target Tracking Using Spatio-Temporal Markov Chain Monte Carlo Data Association. In IEEE Conference on Computer Vision and Pattern Recognition 2007 (CVPR '07), 8 pages.

Zhao, T. et al. 2004. Tracking Multiple Humans in Complex Situations. IEEE Transactions on Pattern Analysis and Machine Intelligence, vol. 26, No. 9., Sep. 2004, pp. 1208-1221.

Zhu, Q. et al. 2006. Fast Human Detection Using a Cascade of Histograms of Oriented Gradients. In Proceedings of the 2006 IEEE Computer Society Conference on Computer Vision and Pattern Recognition (CVPR '06), pp. 1491-1498.

\* cited by examiner

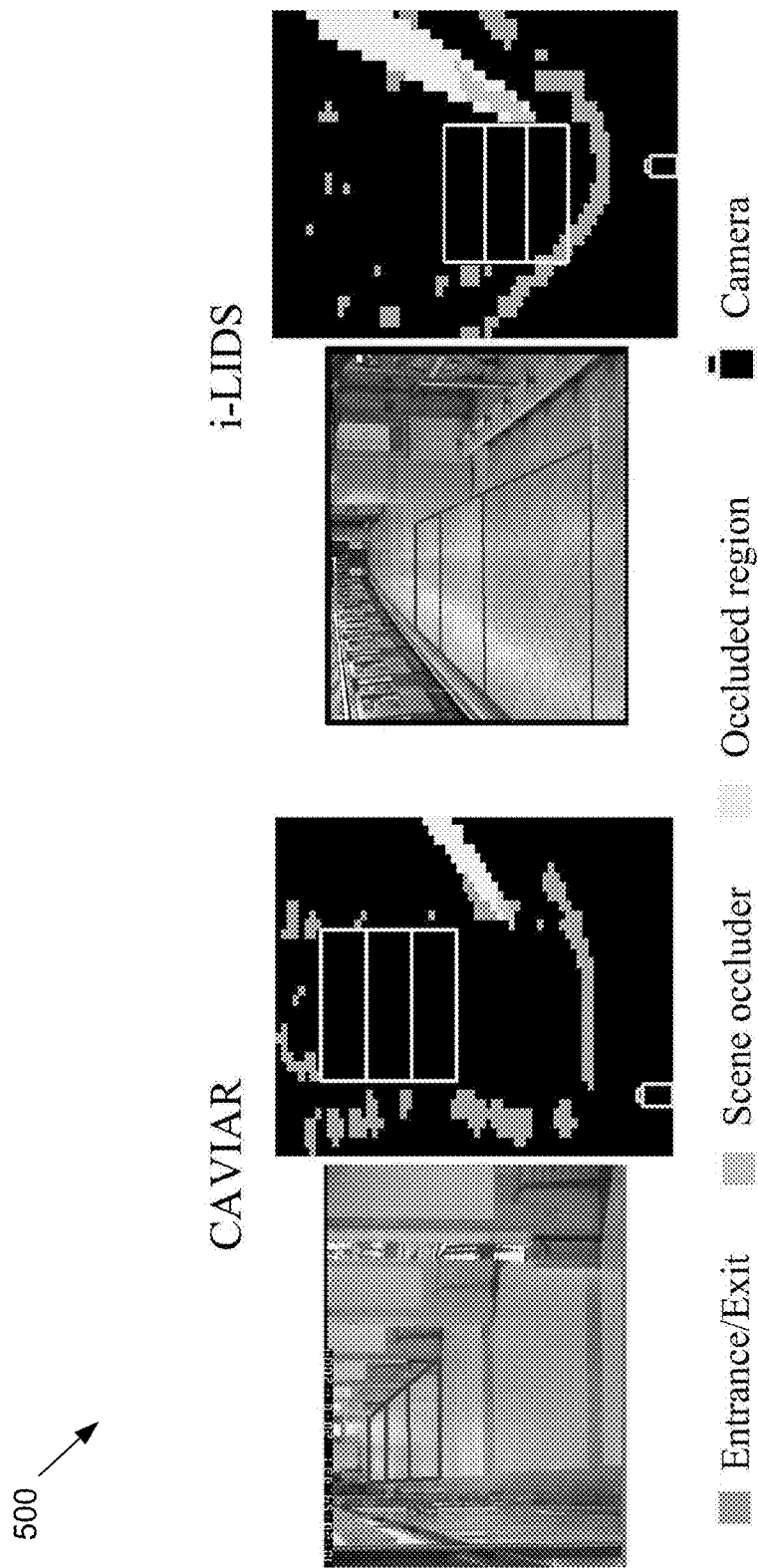

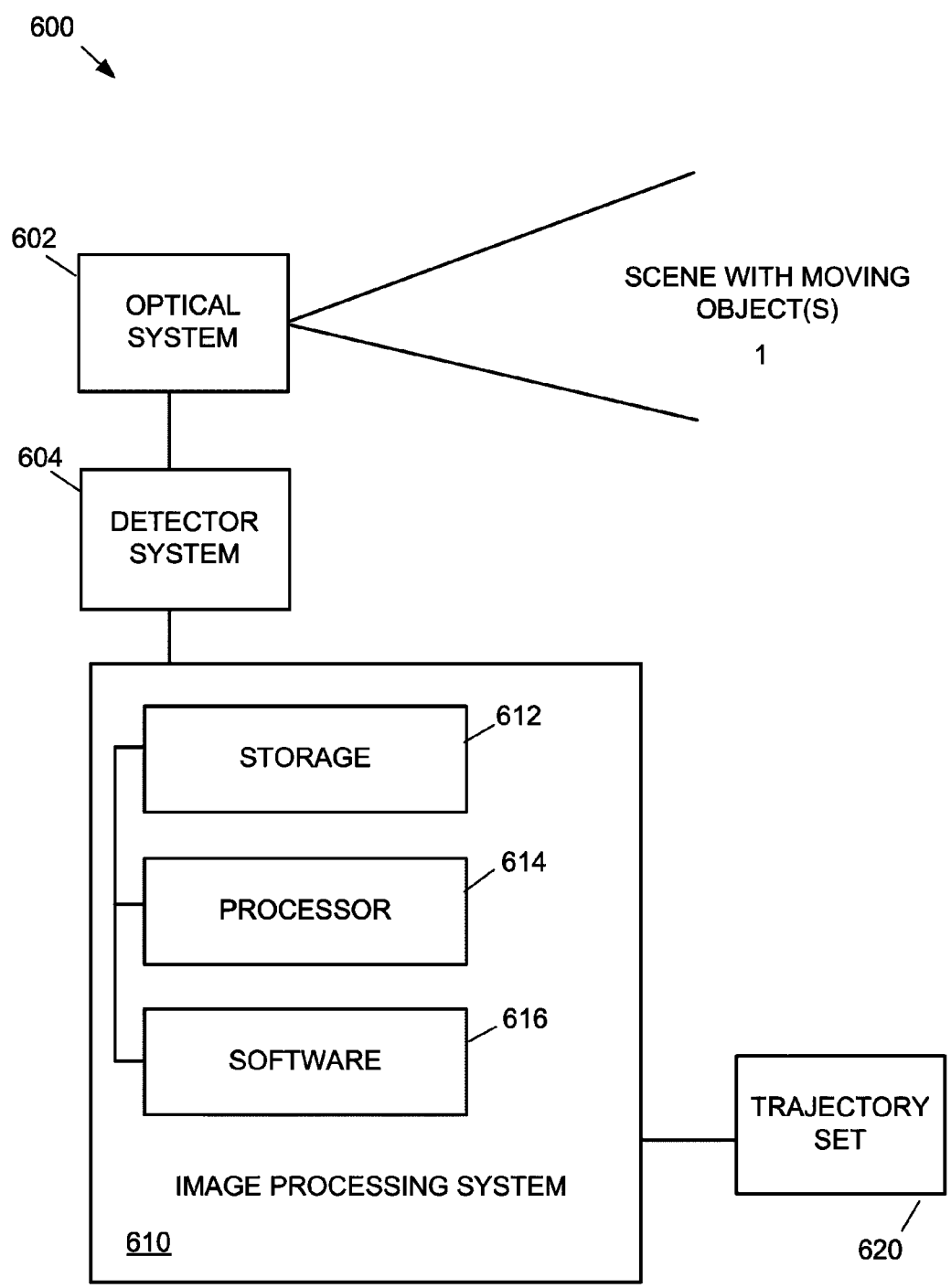

OBJECT TRACKING BY HIERARCHICAL ASSOCIATION OF DETECTION RESPONSES

CROSS-REFERENCE TO RELATED APPLICATION

This application is based upon and claims priority to U.S. Provisional Patent Application No. 61/249,905, entitled "USC Hierarchical Object Tracking System," filed 8 Oct. 2009, the entire contents of which are incorporated herein by reference.

STATEMENT REGARDING FEDERALLY SPONSORED RESEARCH

This invention was made with government support under Contract No. 53-4509-2702 awarded by the Intelligence Advanced Research Projects Activity "VACE" Program. The government has certain rights in the invention.

BACKGROUND

Tracking of objects is important for many computer vision applications. This is a relatively easy task when the objects are isolated and easily distinguished from the background. However, in complex and crowded environments, many objects are present that may have similar appearances, and occlude one another; also occlusions by other scene objects are common.

Traditional feature-based tracking methods, such as those based on color, salient points, or motion, do not have a discriminative model that distinguishes the object category of interest from others. Use of object detectors as discriminative models may help overcome this limitation. The accuracy of the state-of-the-art object detectors is still far from perfect. Missed detections, false alarms and inaccurate responses are common. Such tracking methods therefore are forced to function with such failures, and also with the difficulties due to occlusions and appearance similarity among multiple objects.

SUMMARY

Embodiments of the present disclosure are directed to systems and methods for providing object tracking utilizing associations that are made in several levels and the affinity measure is refined at each level based on the knowledge obtained at the previous level. A scene model may also be estimated from the tracklets and then used to generate final object trajectories.

An aspect of the present disclosure is directed to methods of tracking objects within image frames and that utilize a multi-level hierarchical framework.

A further aspect of the present disclosure is directed to systems for tracking objects within image frames and that utilize a multi-level hierarchical framework.

A further aspect of the present disclosure is directed to articles of manufacture that include a machine readable storage medium having executable program instructions embodied in the machine readable storage medium for controlling an image processing system receiving a plurality of images, to perform functions for object tracking within image frames.

These, as well as other components, steps, features, benefits, and advantages of the present disclosure, will now become clear from a review of the following detailed description of illustrative embodiments, the accompanying drawings, and the claims.

BRIEF DESCRIPTION OF DRAWINGS

The drawings disclose illustrative embodiments. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same numeral appears in different drawings, it refers to the same or like components or steps.

Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure. In the drawings:

FIG. 5 depicts a set of estimated scene structure models for the experimental verification of the implemented method used with CAVIAR and i-LIDS; and FIG. 6 depicts a diagrammatic representation of a system for performing object tracking by hierarchical association of detection responses, in accordance with an exemplary embodiment of the present disclosure.

Figure 1:
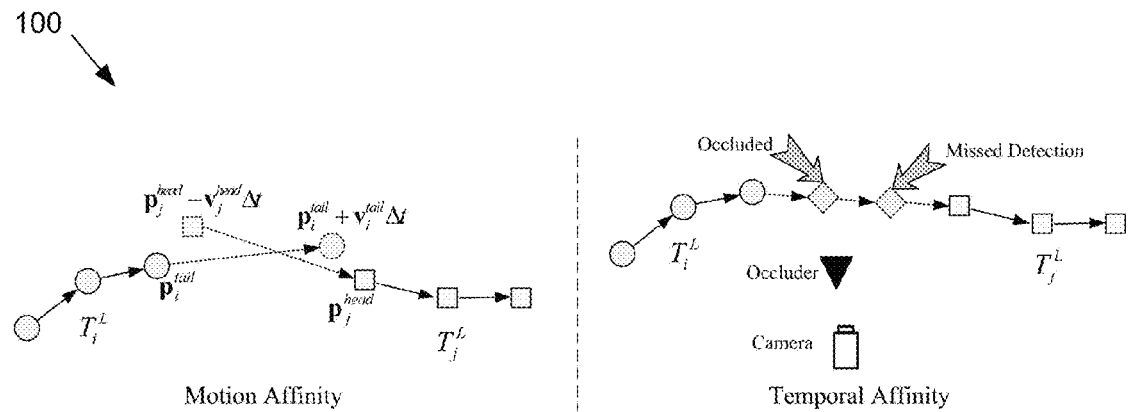
FIG. 1 depicts schematic representations of motion affinity and temporal affinity between two tracklets, in accordance with exemplary embodiments of the present disclosure.

While certain embodiments are depicted in the drawings, one skilled in the art will appreciate that the embodiments depicted are illustrative and that variations of those shown, as well as other embodiments described herein, may be envisioned and practiced within the scope of the present disclosure.

DETAILED DESCRIPTION OF ILLUSTRATIVE EMBODIMENTS

Illustrative embodiments are now discussed. Other embodiments may be used in addition or instead. Details that may be apparent or unnecessary may be omitted to save space or for a more effective presentation. Conversely, some embodiments may be practiced without all of the details that are disclosed.

Embodiments of the present disclosure are directed to systems and methods for performing object tracking by hierarchical association of detection responses. For such embodiments, object trajectories can be obtained by progressively associating detection responses, discerned from image frames, in a multi-level hierarchical framework. As shown in Table. 1, different models and methods may be used to meet the requirements of association at different levels; of course the models and methods indicated in the table are illustrative and other may be used in addition or substitution.

TABLE 1

|  | Motion | Appearance | Association | Scene model | Coordinates |
|---|---|---|---|---|---|
| Low level | N/A | Raw | Direct Link | N/A | Image |
| Middle level | Dynamic | Refined | Hungarian | General | Image |
| High level | Dynamic | Refined | Hungarian | Specific | Ground plane |

For tracking objects in image frames, such as obtained from a video clip, embodiments of the present disclosure can provide a low (first or initial) level of association, in which reliable tracklets are generated by linking detection responses in consecutive frames. A conservative two-threshold strategy can be used to prevent "unsafe" associations until more evidence is collected to reduce the ambiguity at higher levels of association, as described below.

At a middle (second) level of association, the short tracklets obtained at the low level can be iteratively associated, in a process of multiple rounds, into longer and longer tracklets. For this level, a MAP problem can be formulated that considers not only initialization, termination and transition of tracklets but also hypotheses of tracklets being false alarms. In each round, positions and velocities of each input tracklet can be estimated. The resulting information can help refine the appearance model, and additionally provides a motion model to characterize the target. A modified transition matrix can be computed and sent to an implementation of the Hungarian algorithm to obtain optimal association.

At a high (third) level, a scene structure model, including three maps for entries, exits and scene occluders, can be estimated based on the tracklets provided by the middle level. Afterward, the long-range trajectory association can be performed with the help of the scene knowledge based reasoning to reduce trajectory fragmentation and prevent possible identity switches.

In this framework, inaccuracies of detection responses, automatic initializations and terminations of trajectories, and occlusions by scene occluders can be all taken into account. Aspects of the present disclosure can provide: (1) a novel three-level hierarchical framework to progressively associate detection responses, in which different methods and models are adopted to improve tracking robustness; (2) a modified transition matrix for the Hungarian algorithm to solve the association problem that considers not only initialization, termination and transition of tracklets but also false alarm hypotheses; and/or (3) a Bayesian inference approach to automatically estimate a scene structure model as the high-level knowledge for the long-range trajectory association.

Initial Level of Association

A detection response can be denoted by $r_i=(x_i, Y_i, Si, ti, \alpha_i)$, in which $(x_i, Y_i)$ is the position $S_i$ is the size, $t_i$ is the occurrence frame index, and $\alpha_i$ is the color histogram; $T_k=\{r_{ki}|\forall i, t_{k_i} < t_{k_{i+1}}\}$ is an object trajectory/tracklet; $T=\{T_k\}$ is the object trajectory/tracklet set; $T^L, T^M$ and $T^H$ are association results of the low level, the middle level and the high level respectively. An assumption can be made that a detection response can only belong to one tracklet/trajectory, which can be formulated as a non-overlap constraint:

$$\forall E \in \{L,M,H\} \forall T_i, T_j \in T^E, T_i \cap T_j = \phi. \quad (EQ. 1)$$

The set of all detection responses can be denoted by $R=\{r_i\}$. The low-level association can take R as the input, and generates reliable tracklets by a simple and conservative method, direct link. Link probability between two responses is defined as the product of three affinities based on position, size and appearance:

$$P_{link}(r_j | r_i) = \qquad (EQ. 2)$$

$$\begin{cases} A_{pos}(r_j | r_i) A_{size}(r_j | r_i) A_{appr}(r_j | r_i), & \text{if } t_j - t_i = 1 \\ 0, & \text{otherwise.} \end{cases}$$

For this level, the association is constrained to only happen between two consecutive frames. According to the non-overlap constraint in EQ. 1, $(r_i, r_j)$ and $(r_k, r_l)$ are regarded as two conflicting pairs if i=k or j=l. To prevent "unsafe" associations, two responses are linked if and only if their affinity is high enough and significantly higher than the affinity of any of their conflicting pairs $$P_{link}(r_i|r_j) > \theta_1, \text{ and } \forall r_k \in R - \{r_i, r_j\},$$

$$\min[P_{link}(r_i|r_j) - P_{link}(r_k|r_j), P_{link}(r_i|r_j) - P_{link}(r_i|r_k)] > \theta_2, \quad (EQ. 3)$$

where $\theta_1$ and $\theta_2$ are the two thresholds.

Based on this two-threshold strategy, the low-level association can efficiently generate a set of reliable tracklets $T^L=\{T_k^L\}$. Any isolated detection response, which is not linked with any other one, is considered as a degenerate tracklet and also included in $T^L$. The low-level association does not resolve the ambiguity of conflicting pairs, as they can be figured out more effectively at higher levels.

Middle Level of Association

The middle level association is an iterative process: each round takes the tracklets generated in the previous round as the input and does further association. For the first round, the input is $T^L$, which is obtained from the first level of association. A tracklet association may be defined as a set of tracklets:

$$S_k = \left\{T_{i_0}^L, T_{i_1}^L, \ldots, T_{i_{l_k}}^L\right\},$$

where $l_k$ is the number of tracklets in $S_k T_k^M = \cup T_i^L \in S_k T_i^L$ is the corresponding trajectory of $S_k$, and $S=\{S_k\}$ is the tracklet association set.

The objective of the first round association can be formulated as a MAP problem:

$$S^* = \underset{S}{\operatorname{argmax}} P(S | T^L) = \qquad (EQ. 4)$$

$$\underset{S}{\operatorname{argmax}} P(T^L | S) P(S) = \underset{S}{\operatorname{argmax}} \prod_{T_i^L \in T^L} P(T_i^L | S) \prod_{S_k \in S} P(S_k),$$

assuming that the likelihoods of input tracklets are conditionally independent given S, and the tracklet associations $\{S_k\}$ are independent of each other.

A Bernoulli distribution is used to model the probability of a detection response being a true detection or a false alarm. Let $\beta$ be the precision of the detector, the likelihood of an input tracklet is defined as $$P(T_i^L \mid S) = \begin{cases} P_+(T_i^L) = \beta^{|T_i^L|}, & \text{if } \exists S_k \in S, \ T_i^L \in S_k \\ P_-(T_i^L) = (1-\beta)^{|T_i^L|}, & \text{if } \forall S_k \in S, \ T_i^L \notin S_k \end{cases} \quad \text{(EQ. 5)}$$

where $|T_i^L|$ is the number of detection responses in $T_i^L$, and $P_+(T_i^L)$ and $P_-(T_i^L)$ are the likelihoods of $T_i^L$ being a true detection and a false alarm respectively.

The tracklet association priors in EQ. 4 are modeled as Markov Chains:

$$P(S_k) = P_{init}(T_{i_0}^L) P_{link}(T_{i_1}^L \mid T_{i_0}^L) \ldots P_{link}(T_{i_{k-1}}^L \mid T_{i_k}^L) P_{term}(T_{i_k}^L) \quad \text{(EQ. 6)}$$

composed of an initialization term $P_{init}(T_{i_0}^L)$, a termination term $$P_{term}\left(T_{i_k}^L\right)$$

and a series of transition terms $P_{link}(T_{i_{i+1}}^L \mid T_i^L)$. Definitions of these terms are provided below.

Constrained by the non-overlap assumption in Eq. 1, $T_i^L$ cannot belong to more than one $S_k$. Thus, EQ. 4 can be rewritten by inserting $P_+(T_i^L)$ into its corresponding chain:

(EQ. 7)

$$S^* = \underset{S}{\operatorname{argmax}} \prod_{\forall S_k \in S, \ T_i^L \notin S_k} P_-(T_i^L) \prod_{S_k \in S} \left[ P_{init}(T_{i_0}^L) P_+(T_{i_0}^L) P_{link}(T_{i_1}^L \mid T_{i_0}^L) \ldots \right. $$
$$\left. P_{link}(T_{i_k}^L \mid T_{i_{k-1}}^L) P_+(T_{i_k}^L) P_{term}(T_{i_k}^L) \right]$$

This MAP formulation has a distinct property compared to the previous work: it allows $S^*$ to exclude some input tracklets, rejecting them as false alarms instead of receiving their initialization/termination penalties or transition terms by linking them.

Exemplary embodiments of the present disclosure can utilized the Hungarian algorithm. For example, supposing there are n input tracklets, the MAP problem in EQ. 7 can be transformed into a standard assignment problem by defining a transition matrix:

$$C = \begin{bmatrix} C_{11} & C_{12} & \ldots & C_{1n} & C_{1(n+1)} & -\infty & \ldots & -\infty \\ C_{21} & C_{22} & \ldots & C_{2n} & -\infty & C_{2(n+2)} & \ldots & -\infty \\ \ldots & \ldots & \ldots & \ldots & \ldots & \ldots & \ldots & \ldots \\ C_{n1} & C_{n2} & \ldots & C_{nn} & -\infty & -\infty & \ldots & C_{n(2n)} \\ C_{(n+1)1} & -\infty & \ldots & -\infty & 0 & 0 & \ldots & 0 \\ -\infty & C_{(n+2)2} & \ldots & -\infty & 0 & 0 & \ldots & 0 \\ \ldots & \ldots & \ldots & \ldots & \ldots & \ldots & \ldots & \ldots \\ -\infty & -\infty & \ldots & C_{(2n)n} & 0 & 0 & \ldots & 0 \end{bmatrix}_{2n \times 2n} \quad \text{(EQ. 8)}$$

the components of which are defined as:

(EQ. 9)

$$C_{ij} = \begin{cases} \ln P_-(T_i^L), & \text{if } i = j \leq n \\ \ln P_{link}(T_j^L \mid T_i^L) + 0.5[\ln P_+(T_i^L) + \ln P_+(T_j^L)], & \text{if } i, j \leq n \text{ and } i \neq j \\ \ln P_{init}(T_j^L) + 0.5 \ln P_+(T_j^L), & \text{if } i = j + n \\ \ln P_{term}(T_i^L) + 0.5 \ln P_+(T_i^L), & \text{if } i + n = j \\ 0, & \text{if } i > n \text{ and } j > n \\ -\infty, & \text{otherwise} \end{cases}$$

in which $\ln P_+(T_i^L)$ is divided into two halves that are integrated into the two neighboring transition terms respectively.

As previously noted, the MAP formulation can take false alarm hypotheses into account. In particular, this can be represented by the diagonal components of the transition matrix: each one is set to be the logarithmic likelihood of the tracklet being a false alarm, and the self-association of a tracklet is equivalent to rejecting it as a false alarm since it cannot be associated with any other tracklet, initialization or termination. Denoting $\Gamma^* = \lfloor \gamma^*_{ij} \rfloor 2n \times 2n$ as the optimal assignment matrix obtained by applying the Hungarian algorithm to the transition matrix C, for each $\gamma^*_{ij} = 1$, (1) if $i=j \leq n$, $T_i^L$ is considered as a false alarm;
(2) if $i, j \leq n$ and $i \neq j$, link the tail of $T_i^L$ to the head of $T_j^L$;
(3) if $i = j + n$, $T_j^L$ is initialized as the head of the generated trajectory;
(4) if $i + n = j$, $T_i^L$ is terminated as the tail of the generated trajectory. In this way, $S^*$ and its corresponding tracklet set $T^M$ can be computed.

The link probability between two tracklets is defined as the product of three components (appearance, motion and time):

$$P_{link}(T_j^L \mid T_i^L) = A_a(T_j^L \mid T_i^L) A_m(T_j^L \mid T_i^L) A_t(T_j^L \mid T_i^L) \quad \text{(EQ. 10)}$$

To alleviate or mitigate noise from inaccurate detections, for each input tracklet, a Kalman Filter may be used to refine the positions and sizes of its detection responses and estimate their velocities. Color histograms of the detection responses can be recomputed and integrated into a refined color histogram $\alpha^*_i$ for the tracklet by, e.g., a RANSAC method.

The appearance affinity may be defined by a Gaussian distribution:

$$P_{link}(T_j^L \mid T_i^L) = A_a(T_j^L \mid T_i^L) A_m(T_j^L \mid T_i^L) A_t(T_j^L \mid T_i^L) \quad \text{(EQ. 11)}$$

where corr( ) calculates the correlation between $\alpha^*_i$ and $\alpha^*_j$.

The motion affinity can be defined as $$A_m(T_j^L \mid T_i^L) = \quad \text{(EQ. 12)}$$
$$G\left(P_j^{head} + v_i^{tail} \Delta t; P_j^{head}, \sum_{\Delta t}\right) G\left(P_j^{head} + v_j^{head} \Delta t; P_i^{tail}, \sum_{\Delta t}\right),$$

where $\Delta t$ is the frame gap between the tail (i.e. the last detection response) of $T_i^L$ and the head (i.e., the first detection response) of $T_j^L$; $P_i^{head}$ (or $P_i^{tail}$) and $v_i^{head}$ (or $v_i^{tail}$) are the refined position and estimated velocity of $T_i^L$ at the head (or tail) (see FIG. 2 for an illustration). The difference between the predicted position and the observed position is assumed to obey a Gaussian distribution.

The temporal affinity limits the maximum frame gap between two associated tracklets, and measures the probability of missed detections within the gap:

$$A_t(T_j^L \mid T_i^L) = \begin{cases} Z_\xi \alpha^{\Delta t - 1 - \omega}, & \text{if } \Delta t \in [1, \xi] \\ 0, & \text{otherwise,} \end{cases} \quad \text{(EQ. 13)}$$

where $\alpha$ is the missed detection rate of the detector, $\xi$ is an upper bound of frame gap, and $\omega$ is a normalization factor. Within the frame gap, w is the number of frames in which the tracked object is occluded by other objects, and $\Delta t - 1 - \omega$ is the number of frames in which the tracked object is visible but missed by the detector. To compute $\omega$, detection responses can be interpolated within a frame gap. A check can be made to determine whether the detection responses are occluded by other objects, e.g., by applying the occupancy map based occlusion reasoning method disclosed in Wu, B., Nevatia, R., "Detection and Tracking of Multiple, Partially Occluded Humans by Bayesian Combination of Edgelet based Part Detectors," International Journal of Computer Vision (2007), which is incorporated herein by reference in its entirety, to $T^L$.

Initialization and termination probabilities of each tracklet may, for example, be empirically set to the following:

$$P_{init}(T_i^L) = P_{term}(T_j^L) = Z_\xi \alpha^{\frac{1}{2}\xi}. \quad \text{(EQ. 14)}$$

FIG. 1 depicts a diagram 100 showing motion affinity and temporal affinity between two tracklets: the dashed circles and the dashed squares are predictions of $T^L$i and $T^L$j by their motion models, and the dashed diamonds are interpolated responses between the two tracklets. In the following rounds, tracklets with longer frame gaps can be associated by progressively increasing $\xi$.

High-Level Association

During the middle-level association, all tracklets have the same initialization/termination probabilities as there is no prior knowledge about entries and exits at that stage. This is equivalent to assuming uniform distributions of entries and exits in the scene. At the high level, an entry map and an exit map are inferred from $T^M$, which are used to specify the initialization/termination of each tracklet in the scene. In addition, a scene occluder map is also inferred from $T^M$ to revise the link probabilities. The three maps, as hidden variables, constitute a scene structure model in the high-level association. With a homography between the image plane and the ground plane, the scene structure model is estimated in the ground plane coordinates for better accuracy. This coupled scene-estimation tracklet-association problem can be solved by an EM-like algorithm.

In the E-step, the probability distributions of entries, exits and scene occluders are calculated via Bayesian inference:

$$\frac{P(M_q(\bar{x}) = 1 \mid \bar{x})}{P(M_q(\bar{x}) = 0 \mid \bar{x})} = \frac{P(M_q(\bar{x}) = 1)P(\bar{x} \mid M_q(\bar{x}) = 1)}{P(M_q(\bar{x}) = 0)P(\bar{x} \mid M_q(\bar{x}) = 0)} \quad \text{(EQ. 15)}$$

where $M_q(\bar{x}) \in \{0,1\}$ is the indicator function for entries, exits or scene occluders (q={en, ex, oc}) at position x on the ground plane. The positive and negative likelihoods can be computed based on. $T^M$.

Figure 2:
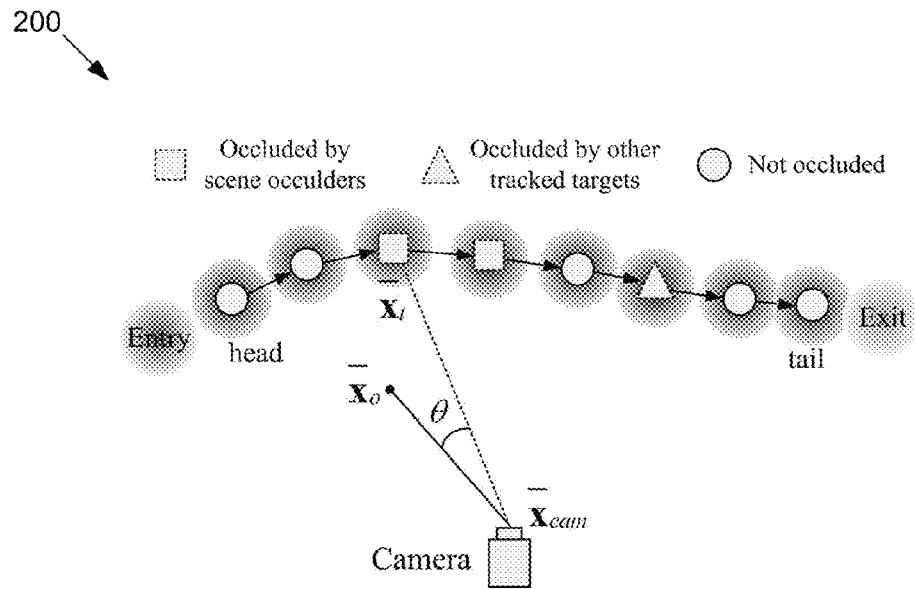
FIG. 2 depicts a schematic representation of hypotheses for entries, exits, and scene occluders as proposed by a tracklet, in accordance with exemplary embodiments of the present disclosure.

FIG. 2 depicts a schematic representation 200 of hypotheses for entries, exits, and scene occluders as proposed by a tracklet, in accordance with exemplary embodiments of the present disclosure. A tracklet $T_k$ can be used to propose a set of hypotheses for entries, exits and scene occluders, as shown in FIG. 2.

The complete version of a tracklet $T_k$ that includes missed detections, $\hat{T}_k = \{r_{k_i}\}$, can be obtained by filling the gaps between inconsecutive detection responses with interpolated ones. One observation is that an entry/exit is likely to be located close to the head/tail of a tracklet. Thus, two Gaussian hypotheses are proposed for the positive likelihoods of the entry and the exit respectively:

$$P_{en+}(\bar{x} \mid T_k) = G(\bar{x}; \bar{x}_{en}, \sigma_p), \vec{x}_{en} = \bar{p}_k^{head} - \vec{v}_k^{head} \Delta t_m$$

$$P_{ex+}(\bar{x} \mid T_k) = G(\bar{x}; \bar{x}_{ex}, \sigma_p), \vec{x}_{ex} = \bar{p}_k^{tail} - \vec{v}_k^{tail} \Delta t_m \quad \text{(EQ. 16)}$$

where $\bar{p}_k^{head}/\bar{p}_k^{tail}$ and $\vec{v}_k^{head}/\vec{v}_k^{tail}$ are the estimated position and velocity at the head/tail of $\hat{T}_k^H$ by the Kalman Filter, and $\Delta t_m$ is a short time span for predicting the positions of the entry and the exit. Another observation is that entries and exits are unlikely to be close to the passed region of a tracklet. Therefore, a mixture of Gaussian hypotheses is adopted to model their negative likelihoods:

$$p_{en-}(\bar{x} \mid T_k) = p_{ex-}(\bar{x} \mid T_k) = \frac{1}{|\hat{T}_k|} \sum_{r_{k_i} \in \hat{T}_k} G(\bar{x}; \bar{x}_{k_i}, \sigma_p) \quad \text{(EQ. 17)}$$

where $\bar{x}_{ki}$ is the position of response $r_{ki}$.

Estimation of the scene occluder map can focus on the area between the camera and the tracklet. Given the camera position $\bar{x}_{cam}$ on the ground plane, an angle-based Gaussian distribution can be defined to model the occlusion relationship between a target at position $\bar{x}_t$ and a scene occluder at position $\bar{x}_o$:

$$\tilde{G}_{angle}(\vec{x}_o, \vec{x}_t, \vec{x}_{cam}) = Z_a G(\text{angle}(\vec{x}_o - \vec{x}_{cam}, \vec{x}_t - \vec{x}_{cam}); 0, \sigma_a) \quad \text{(EQ. 18)}$$

where angle ( ) computes the view angle difference between the target and the occluder (e.g., θ shown in FIG. 2), and $Z_a$ is a normalization factor. The probability is maximized when the occluder lies on the line segment between the target and the camera.

An interpolated response of a tracklet is not detected by the detector. If it is not occluded by any other tracked target, it might be occluded by a scene occluder. Conversely, with high probability, there are no scene occluders lying between the camera and the detection responses. Based on these observations, a tracklet gives positive and negative likelihoods of scene occluders by $$p_{oc+}(\bar{x} \mid T_k) = \frac{1}{|O_k|} \sum_{r_{k_i} \in O_k} \tilde{G}_{angle}(\bar{x}; \bar{x}_{k_i}, \bar{x}_{cam}) \quad \text{(EQ. 19)}$$

$$p_{oc-}(\bar{x} \mid T_k) = \frac{1}{|T_k|} \sum_{r_{k_i} \in T_k} \tilde{G}_{angle}(\bar{x}; \bar{x}_{k_i}, \bar{x}_{cam})$$

where $T_k$ is the original tracklet whose responses are all detected, and $O_k$ is the subset of the complete tracklet $\hat{T}_k$, consisting of the interpolated responses that are not occluded by any other tracked target. Again the occlusion reasoning method in may be adopted to decide the occlusion type of an interpolated response. Interpolated responses that are occluded by other tracked targets make no contributions to the estimation of scene occluders.

Considering the hypotheses proposed by each tracklet as a set of i.i.d. samples extracted from the true likelihood distributions, the likelihoods in EQ. 15 can be approximated by the mixture of all hypotheses, $$P(\bar{x} \mid M_q(\bar{x}) = 1) = \frac{1}{|T^M|} \sum_{T_k \in T^M} p_{q+}(\bar{x} \mid T_k), \quad (EQ. 20)$$

$$P(\bar{x} \mid M_q(\bar{x}) = 0) = \frac{1}{|T^M|} \sum_{T_k \in T^M} p_{q-}(\bar{x} \mid T_k),$$

$$q = \{en, ex, oc\}.$$

Eventually, the posterior probabilities in EQ. 15 can be computed with their corresponding predefined prior probabilities.

In the M-step, the tracklets in $T^M$ can further be associated to form even longer ones. Similar to the middle level, the association problem is formulated as a MAP problem and solved by the Hungarian algorithm. However, based on the scene structure model obtained from the E-step, the initialization and termination probabilities (EQ. 14) of each tracklet are recomputed as:

$$P_{init}(T_k) = Z_\xi \alpha^{min(\frac{1}{2}\xi, \Delta t_{init})}, \quad P_{term}(T_k) = Z_\xi \alpha^{min(\frac{1}{2}\xi, \Delta t_{term})} \quad (EQ. 21)$$

$\Delta t_{init}$ (or $\Delta t_{term}$) is the frame number of missed detection part between the head (or tail) of $T_k$ to the nearest entry (or exit):

$$\Delta t_{init} = \inf\{\Delta t : P(M_{en}(\vec{x})=1 \mid \vec{x} = \vec{x}_k^{head} - \vec{v}_k^{head}\Delta t) > 0.5\},$$

$$\Delta t_{term} = \inf\{\Delta t : P(M_{ex}(\vec{x})=1 \mid \vec{x} = \vec{x}_k^{tail} + \vec{v}_k^{tail}\Delta t) > 0.5\}. \quad (EQ. 22)$$

where inf { } is the infimum of a set. Moreover, an interpolated response $r_o$ at position $\bar{x}_o$ can be considered to be occluded by scene occluders if and only if $$\max_{\alpha \in [0,1]} \lfloor P(M_{OC}(\bar{x}) = 1 \mid \bar{x} = \alpha \bar{x}_0 + (1-\alpha)\bar{x}_{cam})\rfloor > 0.5 \quad (EQ. 23)$$

This can be used to revise the temporal affinity in EQ. 13, considering occlusions by scene occluders when counting the occluded frame number ω.

The scene structure model helps explain three important events for tracklet association: entering the scene, exiting the scene and being occluded by scene occluders. This greatly reduces the ambiguity of associating tracklets with long frame gaps. Compared to parametric sources/sink models and the semi-automatic scene understanding module in prior work, embodiments of the present disclosure can be nonparametric and fully automatic, directly calculating the posterior probability maps, e.g., by Bayesian inference based on object tracklets. Table 2 summarizes the overall algorithm of the hierarchical framework for exemplary embodiments of the present disclosure.

TABLE 2

| |
| --- |
| 0) (Given): the detection response set R, upper bounds of frame gap {~Z |~Z <~Z+1 } and the number of iterations in the middle-level association D |
| 1) (Low-level association): obtain tracklet set $_TL$ by the direct link method. |
| 2) (Middle-level association): Initialize: $T^M$ = TL. For i= 1 to D (Affinity Revision): for each tracklet in $T^M$, obtain a motion model by Kalman filter and a refined appearance model by a RANSAC method; for each frame, compute an occupancy map according to TM. (Association): calculate the transition matrix C with ~Z, obtain the optimal tracklet association set S* and the corresponding T*. Set $T^M$ = T*. |
| 3) (High-level association): (E-step): estimate the scene structure model from TM. (M-step): based on the scene structure model, repeat the iterative process in the middle-level association once with ~ =~D+1 to obtain trajectory set TH. |
| 4) (Output): the complete trajectory set $T^H$ by filling the frame gaps in TH. |

Experimental Results

An implemented embodiment of a hierarchical association framework of the present disclosure was applied to multiple-pedestrian tracking problems. In all experiments, the number of iterations D was set to be 3, and the upper bounds of frame gap $\xi_i$ was set to be 8, 32, 128 for the middle level and 256 for the high level. The implemented method was evaluated on two public video corpora: the CAVIAR set, described and publically available at <http://homepages.inf.ed.ac.uk/rbf/CAVIAR/>; and, the i-LIDS AVSS AB set, described and made publically available at <http://www.elec.qmul.ac.uk/staffinfo/andrea/avss2007d.html>. The CAVIAR set contains 26 videos captured in a corridor, and its ground truth contains 235 trajectories. The i-LIDS AVSS AB set contains three videos captured in a subway station, and its ground truth includes 135 trajectories. Both data sets included heavy occlusions. The pedestrian detector learned by the method disclosed in Wu, B., Nevatia, R., "Detection and Tracking of Multiple, Partially Occluded Humans by Bayesian Combination of Edgelet based Part Detectors," International Journal of Computer Vision (2007) (Wu and Nevatia); none of the videos in these two test sets were used for training.

Metrics in the CLEAR evaluation, made available at <http://www.clear-evaluation.org/>, were adopted and automatic scoring software provided by the organizer was used. The three adopted metrics were: (1) multiple object tracking accuracy (MOTA), calculated from the number of false alarms, missed detections, and identity switches; (2) fraction of ground truth instances missed (FGTIM); and (3) false alarm per frame (FAPF). For the first score, higher is better; for the last two scores, lower is better.

For comparison, the method of Wu & Nevatia was also evaluated on the two video sets. Table 3 lists the scores. Among them, Wu & Nevatia's and the "High level" are the final results of the two methods; the "Low level" and "Middle level round i" (i={1,2,3}) are the intermediate results obtained in the implemented method, which demonstrate the progressive improvement achieved by the hierarchical association framework. In addition, to showing the advantage of the iterative process at the middle level, a simplified version of middle-level association with only one round, denoted as "Middle level #", is evaluated. To show the benefit from the E-step at the high level, an evaluation was made of a degenerate version of the high-level association (denoted as "High level #"), which replaces the estimated scene structure model with a general one. The homography between the image plane and the ground plane was obtained by manually labeling several points on the ground. This could also be easily derived from camera parameters.

TABLE 3

|  | CAVIAR MOTA | i-LIDS FGTIM | FAPF | MOTA | FGTIM | FAPF |
|---|---|---|---|---|---|---|
| Prior Art | 0.537 | 0.470 | 0.012 | 0.553 | 0.370 | 0.228 |
| High level | 0.800 | 0.200 | 0.025 | 0.684 | 0.290 | 0.137 |
| Low level | 0.540 | 0.338 | 0.395 | 0.475 | 0.507 | 0.080 |
| Middle level round 1 | 0.627 | 0.332 | 0.141 | 0.490 | 0.507 | 0.042 |
| Middle level round 2 | 0.694 | 0.292 | 0.064 | 0.547 | 0.459 | 0.024 |
| Middle level round 3 | 0.759 | 0.235 | 0.032 | 0.640 | 0.358 | 0.059 |
| Middle level # | 0.705 | 0.263 | 0.118 | 0.592 | 0.401 | 0.060 |
| High level # | 0.771 | 0.223 | 0.041 | 0.656 | 0.343 | 0.062 |

As shown in Table 3, from the low level to the high level, the MOTA score of the implemented method of the present disclosure progressively increased, while the FGTIM score and the FAPF score gradually decreased. The low-level association has the lowest detection rate and the highest false alarm rate since it just links detection responses in consecutive frames and doesn't take false alarm hypotheses into account. As the hierarchical association proceeded, the upper bound of frame gap $\xi$ increased from 8 to 256. On one hand, doing so enabled the algorithm to associate strong tracklets with long frame gaps, so that more and more missed detections were recovered; on the other hand, doing so decreased the initialization and termination probabilities of each tracklet (see EQ. 14), so that weak tracklets were more likely to be rejected as false alarms. Compared to Wu & Nevatia's method, the implemented method achieved a comparably low FAPF score, a much lower FGTIM score, and a much higher MOTA score.

Figure 3:
FIG. 3 depicts a set tracking results of an implemented embodiment as used with the CAVIAR video set.

FIG. 3 depicts a set 300 of tracking results of the implemented embodiment as used with the CAVIAR video set. The first row (input detection responses) and the second row (tracking results) of FIG. 3 demonstrate the improvements achieved by the implemented method: (1) two false alarms in frame 133 were rejected by the false alarm hypotheses in the MAP formulation; (2) three missed detections in frame 233 were recovered by associating long-gap tracklets; (3) an inaccurate response in frame 407 was corrected. The third row is the tracking result of another video in the CAVIAR set. The experimental results show that the implemented method was able overcome deficiencies of previous techniques.

Compared to the iterative association approach ("Middle level round 3") at the middle level, the simplified one ("Middle level #") appeared to be inferior in terms of all three scores. Without the estimated specific scene structure model, the degenerate high-level association ("High level #") did not perform as well as the original one ("High level"). The comparisons justify the use of the iterative association approach and the specific scene structure model used for embodiments of the present disclosure.

Figure 4:
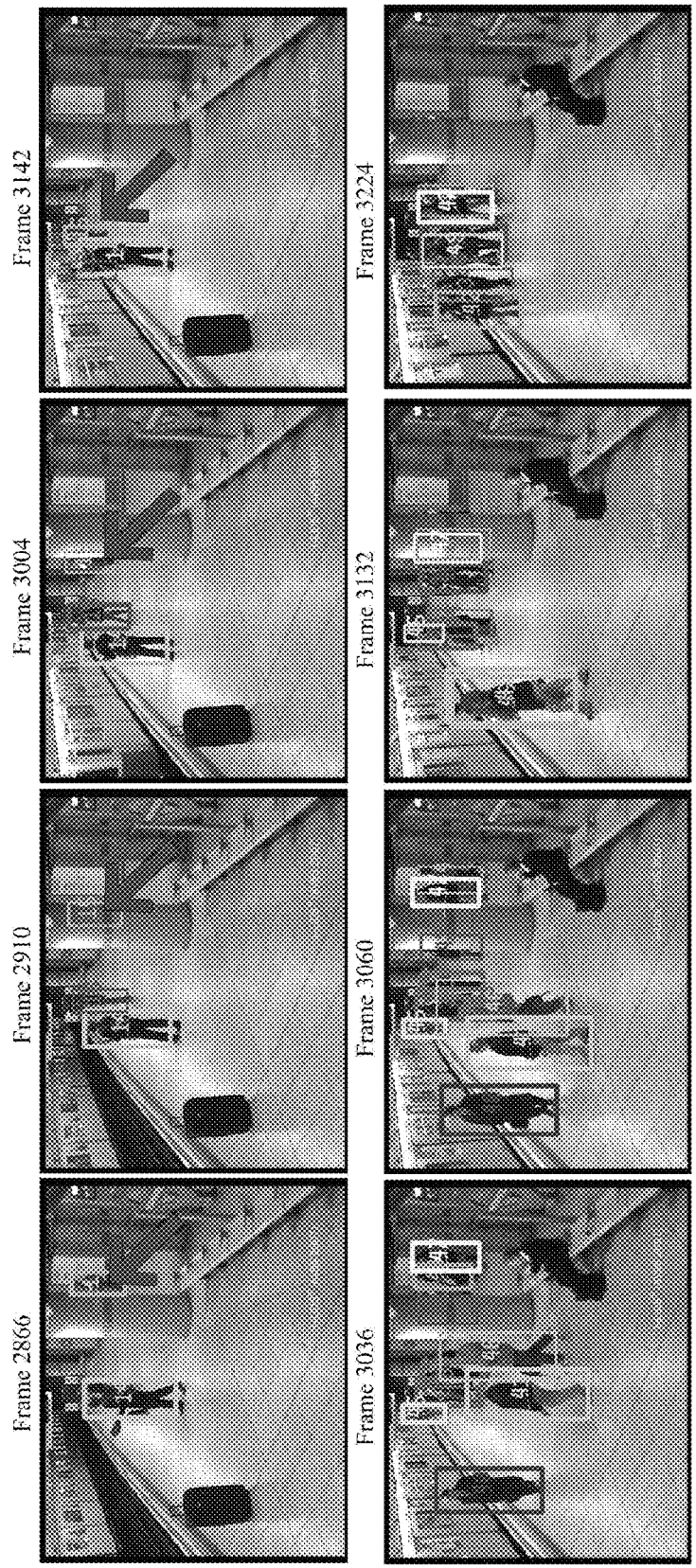
FIG. 4 depicts a set of tracking results of an implemented embodiment as used with the i-LIDS video set.

FIG. 4 depicts a set 400 of tracking results of an implemented embodiment as used with the i-LIDS video set. The first row of FIG. 4 shows an example from the i-LIDS set, in which the trajectory 15 is not broken although it is occluded by the pillar for more than 200 frames, i.e., ~eight (8) seconds.

Similar to the results on the CAVIAR set, embodiments of the present disclosure were shown to achieve significant improvement for MOTA and FGTIM on the i-LIDS set. However, the FAPF scores is not monotonously reduced: it drops to the minimum at the second round of the middle level and rises afterward. This may be attributable to the extremely heavy inter-occlusions in this data set (as shown in the second row of FIG. 4): when a train stops at the station, many pedestrians rush in and out of the carriage in a short time. Tracklets of pedestrians in such crowded environments are highly fragmented and noisy. Associating these tracklets with long frame gaps may be potentially risky, since it is often difficult to distinguish too many disordered targets with similar appearance based on color and motion. However, as the tradeoff between the detection rate and the false alarm rate, the MOTA score keeps increasing, and the final results of the implemented method were shown, for all three scores, to outperform those of the prior art, e.g., Wu, B., Nevatia, R., "Detection and Tracking of Multiple, Partially Occluded Humans by Bayesian Combination of Edgelet based Part Detectors," International Journal of Computer Vision (2007). Again, the difference between the two modified methods ("Middle level #" and "High level #") and their original versions ("Middle level round 3" and "High level") justify the use of the iterative association approach and the specific scene structure model.

In practice, the three probability maps in the scene structure model can be implemented as discrete grids for efficiency. FIG. 5 depicts a set 500 of estimated scene structure models for the experimental verification of the implemented method used with CAVIAR and i-LIDS: the entry map and the exit map are both painted as they were mostly overlapped; the occluded region was inferred from the positions of camera (at the bottom) and scene occluders; the three rectangles of each image indicate the ground plane coordinates. To visualize the estimated scene structure model, every probability map can be binarized with a threshold of, e.g., 0.5 as shown in FIG. 5. It can be seen that the Bayesian inference approach in the E-step of the high level is capable of effectively reconstructing the crucial environment elements for the final association in the M-step. In particular, methods of the present disclosure can successfully locate the pillars as occluders in both scenes, which is important for the recovery of trajectories occluded by the pillar for a long time.

For computational efficiency, a sliding window technique was used at the middle level to reduce the size of transition matrix for the Hungarian algorithm. Given the detection results, the speed of an implemented method was about 50 FPS on a 3.00 Hz PC.

FIG. 6 depicts a diagrammatic representation of a system 600 for performing object tracking by hierarchical association of detection responses, in accordance with an exemplary embodiment of the present disclosure. As shown, system 600 can include an optical system 602 that is able to view a scene 1, which can include one or more moving objects. Any suitable optical system, e.g., collection optics, can be used for optical system 602. It is noted that optical system 602 is not necessarily limited to receiving visible light but can be designed for use with any portion of the EM spectrum, e.g., all types of IR, UV, X-ray, etc.

System 600 can also in include a detector system 604 that is operational to receive light/radiation from the optical system and provide an output signal representative of an image of the scene. Detector system 604 may be separate, within, or integral with the optical system 602. Any suitable detector designed for use with the radiation received/processed by the optical system 602 can be used for the detector system 604. Exemplary embodiments can include CCD detectors operational to detect visible or IR light.

System 600 also includes an image processing system 610 that is operational to receive the signal with image data from detector system 604, process the data for object tracking by hierarchical association of detection responses, in accordance with embodiments of the present disclosure, and provide a trajectory set as an output. Image processing system 610 may function on its own. Image processing system 610 can include storage 612, e.g., any suitable ROM and/or RAM memory, etc. A hardware processing system (indicated by processor 614) can also be included. Any suitable processor can be used. Software 616 can also be included, as shown. In exemplary embodiments, software 616 can include computer-readable (or, machine-readable) instructions, which can be stored in non-transitory storage media, e.g., RAM, ROM, a hardware cache or buffer, etc., for implementing methods according to the present disclosure. Processor 614 can operate to implement software 616.

Accordingly, embodiments of the present disclosure can provide a robust hierarchical association framework for the multiple object tracking problem. Experimental results on two challenging The components, steps, features, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently.

In reading the present disclosure, one skilled in the art will appreciate that embodiments of the present disclosure can be implemented in [software]

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications which have been cited in this disclosure are hereby incorporated herein by reference.

The phrase "means for" when used in a claim is intended to and should be interpreted to embrace the corresponding structures and materials that have been described and their equivalents. Similarly, the phrase "step for" when used in a claim embraces the corresponding acts that have been described and their equivalents. The absence of these phrases means that the claim is not intended to and should not be interpreted to be limited to any of the corresponding structures, materials, or acts or to their equivalents.

Nothing that has been stated or illustrated is intended or should be interpreted to cause a dedication of any component, step, feature, object, benefit, advantage, or equivalent to the public, regardless of whether it is recited in the claims.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents.

What is claimed is:

1. An image processing system configured to receive a plurality of input images and track objects within image frames, the system comprising:
a hardware processing system configured to:
perform a first level of association between detection responses in image frames, wherein the detection responses include a vector having position, size, and frame index components, including forming one or more tracklets between pairs of detection responses having suitable link probabilities;
receive the one or more tracklets formed as a result of the first level of association, and perform a second level of association, including producing a tracklet association between tracklets;
perform a third level of association, including estimating a scene structure model from the second level of association; and
provide as an output a trajectory set of the tracklets.

2. The system of claim 1, wherein for the first level of association, the hardware processing system is configured to calculate the link probabilities as products of affinities.

3. The system of claim 2, wherein the affinities comprise a position affinity.

4. The system of claim 2, wherein the affinities comprise a size affinity.

5. The system of claim 2, wherein the affinities comprise an appearance affinity.

6. The system of claim 1, wherein for the first level of association, the hardware processing system is configured to link two responses in response to an affinity between the two responses being greater than a first threshold.

7. The system of claim 1, wherein for the first level of association, the hardware processing system is configured to link two responses in response to an affinity between the two responses being greater than an affinity of conflicting pairs.

8. The system of claim 1, wherein the second level of association includes an iterative process of multiple rounds, and wherein for each round the hardware processing system is configured to receive as an input a tracklet generated in the previous round and in response produce a further association.

9. The system of claim 8, wherein the objective of the first round of association of the second level is formulated as a MAP problem.

10. The system of claim 8, wherein for the second level of association, the hardware processing system is further configured to transform a maximum a posteriori (MAP) problem into an assignment problem in a way that distinguishes between true trajectories and false alarm trajectories using a Hungarian algorithm.

11. An article of manufacture comprising:
a non-transitory machine readable storage medium; and
executable program instructions embodied in the machine readable storage medium that when executed by a processor of a programmable computing device configures the programmable computing device to control an image processing system receiving a plurality of images, to perform functions for object tracking within image frames, including instructions to:
perform a first level of association between detection responses in image frames, including forming one or more tracklets between pairs of detection responses having suitable link probabilities, wherein the detection responses include a vector having position, size, and frame index components;
receive the one or more tracklets formed as a result of the first level of association, and perform a second level of association, including producing a tracklet association between tracklets;
perform a third level of association, including estimating a scene structure model from the second level of association; and
provide as an output a trajectory set of the tracklets.

12. The article of manufacture of claim 11, wherein the executable program instructions further comprise instruction to:
for the second level of association, transform a maximum a posteriori (MAP) problem into an assignment problem in a way that distinguishes between true trajectories and false alarm trajectories using a Hungarian algorithm.

13. A method of object tracking within image frames, the method comprising:

using a processing system, performing a first level of association between detection responses in image frames, wherein the detection responses include a vector having position, size, and frame index components, the first level of association including forming one or more tracklets between pairs of detection responses having suitable link probabilities, wherein the first level of association produces a tracklet set, and the second level of association comprises, for each tracklet in the in the tracklet set, obtaining a motion model and an appearance model;

using the processing system, receiving the one or more tracklets formed as a result of the first level of association, performing a second level of association, including producing a tracklet association between tracklets, wherein the second level of association comprises obtaining an optimal tracklet association set and a corresponding tracklet set;

using the processing system, performing a third level of association, wherein performing a third level of association includes estimating a scene structure model from the second level of association; and provide as an output a trajectory set of the tracklets.

14. The method of claim 13, wherein performing a first level of association comprises calculating the link probabilities as products of position, size, and appearance affinities.

15. The method of claim 13, wherein for the first level of association, the two responses are linked in response to the affinity being greater than a first threshold.

16. The method of claim 13, wherein the second level of association includes an iterative process of multiple rounds, wherein each round receives as an input a tracklet generated in the previous round and in response produces further association.

17. The method of claim 13, wherein the objective of the first round of association of the second level is formulated as a maximum a posteriori (MAP) problem.

18. The method of claim 17, further comprising transforming the MAP problem into an assignment problem in a way that distinguishes between true trajectories and false alarm trajectories using a Hungarian algorithm.

19. The method of claim 13, wherein for the first level of association, the one or more tracklets have the same initialization and termination probabilities as to entries and exits in respective frames.

20. The method of claim 13, wherein for the third level of association, an entry map and an exit map are produced from the second level of association and used to specify the initialization and termination of each tracklet in an image scene, and a scene occluder map is produced from the second level of association and used to revise the link probabilities.

* * * * *